United States Patent
Westmoreland et al.

(10) Patent No.: US 9,528,444 B2
(45) Date of Patent: Dec. 27, 2016

(54) SYSTEM HAVING MULTI-TUBE FUEL NOZZLE WITH FLOATING ARRANGEMENT OF MIXING TUBES

(71) Applicant: General Electric Company, Schenectady, NY (US)

(72) Inventors: James Harold Westmoreland, Greer, SC (US); Gregory Allen Boardman, Greer, SC (US); Patrick Benedict Melton, Horse Shoe, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 827 days.

(21) Appl. No.: 13/797,961

(22) Filed: Mar. 12, 2013

(65) Prior Publication Data
US 2014/0260315 A1 Sep. 18, 2014

(51) Int. Cl.
F02C 7/20 (2006.01)
F23R 3/28 (2006.01)
F02C 7/22 (2006.01)
F02C 7/236 (2006.01)

(52) U.S. Cl.
CPC . *F02C 7/20* (2013.01); *F02C 7/22* (2013.01); *F02C 7/2365* (2013.01); *F23R 3/286* (2013.01)

(58) Field of Classification Search
CPC ............ F23R 3/283; F23R 3/286; F23R 3/10; F23R 2900/00005; F23R 2900/00012; F23D 14/62; F23D 14/64
See application file for complete search history.

(56) References Cited

U.S. PATENT DOCUMENTS

| | | |
|---|---|---|
| 1,855,165 A | 4/1932 | Barker |
| 2,564,042 A | 8/1951 | Walker |
| 3,581,492 A | 6/1971 | Norgren et al. |
| 3,751,911 A | 8/1973 | De Tartaglia |
| 4,100,733 A | 7/1978 | Striebel et al. |
| 4,408,461 A | 10/1983 | Bruhwiler et al. |
| 4,587,809 A | 5/1986 | Ohmori et al. |
| 4,763,481 A | 8/1988 | Cannon |
| 4,796,429 A | 1/1989 | Verdouw |
| 5,121,597 A | 6/1992 | Urushidani et al. |
| 5,161,366 A | 11/1992 | Beebe |
| 5,235,814 A | 8/1993 | Leonard |
| 5,274,991 A | 1/1994 | Fitts |
| 5,361,586 A | 11/1994 | McWhirter et al. |
| 5,410,884 A | 5/1995 | Fukue et al. |
| 5,415,000 A | 5/1995 | Mumford et al. |
| 5,515,680 A | 5/1996 | Fujimura et al. |
| 5,611,196 A | 3/1997 | Wilson |
| 5,675,971 A | 10/1997 | Angel et al. |

(Continued)

OTHER PUBLICATIONS

U.S. Appl. No. 13/797,848, filed Mar. 12, 2013, Boardman et al.

(Continued)

*Primary Examiner* — Phutthiwat Wongwian
*Assistant Examiner* — Stefan Ibroni
(74) *Attorney, Agent, or Firm* — Fletcher Yoder, P.C.

(57) ABSTRACT

A system includes a multi-tube fuel nozzle. The multi-tube fuel nozzle includes an end cover, a first plate, and multiple tubes. The multiple tubes are disposed and supported in a floating arrangement between the end cover and the first plate. Each tube includes a forward end adjacent the end cover and an aft end adjacent the first plate.

13 Claims, 9 Drawing Sheets

(56) References Cited

U.S. PATENT DOCUMENTS

| | | | |
|---|---|---|---|
| 5,778,676 A | 7/1998 | Joshi et al. | |
| 5,816,049 A | 10/1998 | Joshi | |
| 5,822,992 A | 10/1998 | Dean | |
| 5,901,555 A | 5/1999 | Mandai et al. | |
| 5,927,076 A | 7/1999 | Pillsbury | |
| 5,943,866 A | 8/1999 | Lovett et al. | |
| 6,016,658 A | 1/2000 | Willis et al. | |
| 6,026,645 A | 2/2000 | Stokes et al. | |
| 6,038,861 A | 3/2000 | Amos et al. | |
| 6,092,363 A | 7/2000 | Ryan | |
| 6,164,055 A | 12/2000 | Lovett et al. | |
| 6,334,309 B1 | 1/2002 | Dean et al. | |
| 6,351,948 B1* | 3/2002 | Goeddeke | F23D 11/24 60/740 |
| 6,360,776 B1 | 3/2002 | McCormick et al. | |
| 6,363,724 B1 | 4/2002 | Bechtel et al. | |
| 6,438,959 B1 | 8/2002 | Dean et al. | |
| 6,438,961 B2 | 8/2002 | Tuthill et al. | |
| 6,530,222 B2 | 3/2003 | Stuttaford et al. | |
| 6,532,742 B2 | 3/2003 | Scarinci et al. | |
| 6,705,087 B1 | 3/2004 | Ohri et al. | |
| 6,832,483 B2 | 12/2004 | Moriya et al. | |
| 6,880,340 B2 | 4/2005 | Saitoh | |
| 6,928,823 B2 | 8/2005 | Inoue et al. | |
| 6,983,600 B1 | 1/2006 | Dinu et al. | |
| 7,007,478 B2 | 3/2006 | Dinu | |
| 7,007,486 B2 | 3/2006 | Sprouse et al. | |
| 7,021,562 B2 | 4/2006 | Mansour et al. | |
| 7,134,287 B2 | 11/2006 | Belsom et al. | |
| 7,171,813 B2 | 2/2007 | Tanaka et al. | |
| 7,181,916 B2* | 2/2007 | Ziminsky | F23D 14/74 60/776 |
| 7,284,378 B2 | 10/2007 | Amond, III et al. | |
| 7,469,544 B2 | 12/2008 | Farhangi | |
| 7,578,130 B1 | 8/2009 | Kraemer et al. | |
| 7,617,682 B2 | 11/2009 | Bruck | |
| 7,841,180 B2 | 11/2010 | Kraemer et al. | |
| 7,841,182 B2 | 11/2010 | Martin | |
| 7,900,456 B2* | 3/2011 | Mao | F23D 11/107 60/740 |
| 8,042,339 B2 | 10/2011 | Lacy et al. | |
| 8,065,880 B2 | 11/2011 | Ishizaka et al. | |
| 8,079,218 B2 | 12/2011 | Widener | |
| 8,104,291 B2* | 1/2012 | Myers | F23R 3/002 60/799 |
| 8,122,721 B2* | 2/2012 | Johnson | F23D 14/48 60/737 |
| 8,205,452 B2 | 6/2012 | Boardman et al. | |
| 8,234,871 B2 | 8/2012 | Davis, Jr. et al. | |
| 8,234,872 B2 | 8/2012 | Berry et al. | |
| 8,240,151 B2* | 8/2012 | Pelletier | F23D 11/107 60/740 |
| 8,266,912 B2 | 9/2012 | Berry et al. | |
| 8,276,385 B2 | 10/2012 | Zuo et al. | |
| 8,322,143 B2 | 12/2012 | Uhm et al. | |
| 8,327,642 B2 | 12/2012 | Uhm et al. | |
| 8,402,763 B2 | 3/2013 | Mulherin et al. | |
| 8,408,004 B2 | 4/2013 | Davis, Jr. et al. | |
| 8,424,311 B2 | 4/2013 | York et al. | |
| 8,438,853 B2 | 5/2013 | Green et al. | |
| 8,474,265 B2 | 7/2013 | Jain et al. | |
| 8,484,978 B2 | 7/2013 | Bailey et al. | |
| 8,505,304 B2 | 8/2013 | Myers et al. | |
| 8,522,555 B2 | 9/2013 | Berry et al. | |
| 8,528,334 B2 | 9/2013 | Dutta et al. | |
| 8,528,336 B2 | 9/2013 | Cihlar et al. | |
| 8,528,839 B2 | 9/2013 | Bailey et al. | |
| 8,572,979 B2 | 11/2013 | Smith et al. | |
| 8,616,002 B2 | 12/2013 | Kraemer et al. | |
| 8,701,419 B2 | 4/2014 | Hughes | |
| 8,789,372 B2 | 7/2014 | Johnson et al. | |
| 8,800,289 B2 | 8/2014 | Johnson et al. | |
| 8,850,821 B2 | 10/2014 | Khan et al. | |
| 8,899,049 B2 | 12/2014 | Krull et al. | |
| 8,904,797 B2 | 12/2014 | Berry et al. | |
| 8,919,127 B2 | 12/2014 | Melton et al. | |
| 8,938,978 B2 | 1/2015 | Bailey et al. | |
| 9,032,704 B2 | 5/2015 | Crothers et al. | |
| 9,163,839 B2 | 10/2015 | Westmoreland et al. | |
| 9,200,571 B2 | 12/2015 | Bailey et al. | |
| 9,255,711 B2 | 2/2016 | Crothers et al. | |
| 9,316,397 B2 | 4/2016 | Stewart et al. | |
| 2001/0052229 A1 | 12/2001 | Tuthill et al. | |
| 2002/0014078 A1 | 2/2002 | Mandai et al. | |
| 2002/0119412 A1 | 8/2002 | Loving | |
| 2002/0128790 A1 | 9/2002 | Woodmansee | |
| 2002/0192615 A1 | 12/2002 | Moriya et al. | |
| 2003/0014975 A1 | 1/2003 | Nishida et al. | |
| 2003/0037549 A1 | 2/2003 | Mandai et al. | |
| 2003/0089801 A1 | 5/2003 | Saitoh et al. | |
| 2004/0006990 A1 | 1/2004 | Stuttaford et al. | |
| 2004/0006991 A1 | 1/2004 | Stuttaford et al. | |
| 2004/0006992 A1 | 1/2004 | Stuttaford et al. | |
| 2004/0006993 A1 | 1/2004 | Stuttaford et al. | |
| 2004/0060297 A1 | 4/2004 | Koenig et al. | |
| 2004/0142294 A1 | 7/2004 | Niass et al. | |
| 2004/0163392 A1 | 8/2004 | Nishida et al. | |
| 2007/0289305 A1 | 12/2007 | Oda et al. | |
| 2008/0053097 A1 | 3/2008 | Han et al. | |
| 2008/0078179 A1 | 4/2008 | Cai | |
| 2008/0163627 A1 | 7/2008 | ELKady et al. | |
| 2009/0229269 A1 | 9/2009 | Lacy et al. | |
| 2009/0241547 A1 | 10/2009 | Luts et al. | |
| 2009/0280443 A1 | 11/2009 | Carroni et al. | |
| 2010/0064691 A1 | 3/2010 | Laster et al. | |
| 2010/0089065 A1 | 4/2010 | Tuthill | |
| 2010/0192579 A1 | 8/2010 | Boardman et al. | |
| 2010/0192583 A1 | 8/2010 | Cano Wolff et al. | |
| 2010/0192586 A1 | 8/2010 | Terada et al. | |
| 2010/0205970 A1 | 8/2010 | Hessler et al. | |
| 2010/0218501 A1 | 9/2010 | York et al. | |
| 2010/0236252 A1 | 9/2010 | Huth | |
| 2010/0263384 A1 | 10/2010 | Chila | |
| 2011/0005230 A1 | 1/2011 | Bailey et al. | |
| 2011/0016866 A1 | 1/2011 | Boardman et al. | |
| 2011/0016871 A1 | 1/2011 | Kraemer et al. | |
| 2011/0107764 A1 | 5/2011 | Bailey et al. | |
| 2011/0113783 A1* | 5/2011 | Boardman | F23C 13/06 60/723 |
| 2011/0197591 A1 | 8/2011 | Valeev et al. | |
| 2011/0209481 A1 | 9/2011 | Simmons | |
| 2011/0314823 A1 | 12/2011 | Smith et al. | |
| 2012/0047902 A1 | 3/2012 | Tuthill | |
| 2012/0055167 A1 | 3/2012 | Johnson et al. | |
| 2012/0073302 A1 | 3/2012 | Myers et al. | |
| 2012/0180487 A1 | 7/2012 | Uhm et al. | |
| 2012/0180488 A1 | 7/2012 | Bailey et al. | |
| 2012/0227371 A1 | 9/2012 | Johnson et al. | |
| 2012/0324896 A1 | 12/2012 | Kim et al. | |
| 2013/0025285 A1 | 1/2013 | Stewart et al. | |
| 2013/0067920 A1 | 3/2013 | Fox et al. | |
| 2013/0074503 A1 | 3/2013 | Rohrssen et al. | |
| 2013/0086912 A1 | 4/2013 | Berry | |
| 2013/0104554 A1 | 5/2013 | Bode et al. | |
| 2013/0125549 A1 | 5/2013 | Bailey et al. | |
| 2013/0180256 A1* | 7/2013 | Stoia | F23R 3/283 60/772 |
| 2013/0213051 A1 | 8/2013 | Westmoreland, III et al. | |
| 2013/0232977 A1* | 9/2013 | Siddagangaiah | F23R 3/14 60/737 |
| 2013/0232979 A1 | 9/2013 | Singh | |
| 2013/0299602 A1 | 11/2013 | Hughes et al. | |
| 2014/0033718 A1 | 2/2014 | Manoharan et al. | |
| 2014/0033722 A1 | 2/2014 | Abdel-Hafez et al. | |
| 2014/0109587 A1 | 4/2014 | Crothers et al. | |
| 2014/0245738 A1 | 9/2014 | Crothers et al. | |
| 2014/0260259 A1 | 9/2014 | Ginesin et al. | |
| 2014/0260267 A1 | 9/2014 | Melton et al. | |
| 2014/0260268 A1 | 9/2014 | Westmoreland et al. | |
| 2014/0260271 A1 | 9/2014 | Keener et al. | |
| 2014/0260276 A1 | 9/2014 | Westmoreland et al. | |
| 2014/0260299 A1 | 9/2014 | Boardman et al. | |
| 2014/0260300 A1 | 9/2014 | Chila et al. | |

(56) References Cited

U.S. PATENT DOCUMENTS

| | | |
|---|---|---|
| 2014/0260315 A1 | 9/2014 | Westmoreland et al. |
| 2014/0283522 A1 | 9/2014 | Boardman et al. |
| 2014/0338338 A1 | 11/2014 | Chila et al. |
| 2014/0338339 A1 | 11/2014 | Westmoreland et al. |
| 2014/0338340 A1 | 11/2014 | Melton et al. |
| 2014/0338344 A1 | 11/2014 | Stewart et al. |
| 2014/0338354 A1 | 11/2014 | Stewart et al. |
| 2014/0338356 A1 | 11/2014 | Keener et al. |
| 2014/0367495 A1 | 12/2014 | Monaghan et al. |
| 2015/0000285 A1 | 1/2015 | Deiss et al. |
| 2015/0059353 A1 | 3/2015 | Asai et al. |
| 2015/0165568 A1 | 6/2015 | Means et al. |
| 2016/0040883 A1 | 2/2016 | Asai et al. |
| 2016/0060154 A1 | 3/2016 | Cowles et al. |

OTHER PUBLICATIONS

U.S. Appl. No. 13/797,859, filed Mar. 12, 2013, Boardman et al.
U.S. Appl. No. 13/797,883, filed Mar. 12, 2013, Melton et al.
U.S. Appl. No. 13/797,896, filed Mar. 12, 2013, Westmoreland et al.
U.S. Appl. No. 13/797,912, filed Mar. 12, 2013, Chila et al.
U.S. Appl. No. 13/797,925, filed Mar. 12, 2013, Westmoreland et al.
U.S. Appl. No. 13/797,986, filed Mar. 12, 2013, Chila et al.
U.S. Appl. No. 13/798,012, filed Mar. 12, 2013, Melton et al.
U.S. Appl. No. 13/798,027, filed Mar. 12, 2013, Westmoreland et al.
U.S. Appl. No. 13/400,248, filed Feb. 20, 2012, Westmoreland et al.
U.S. Appl. No. 13/705,443, filed Dec. 5, 2012, Belsom et al.

\* cited by examiner

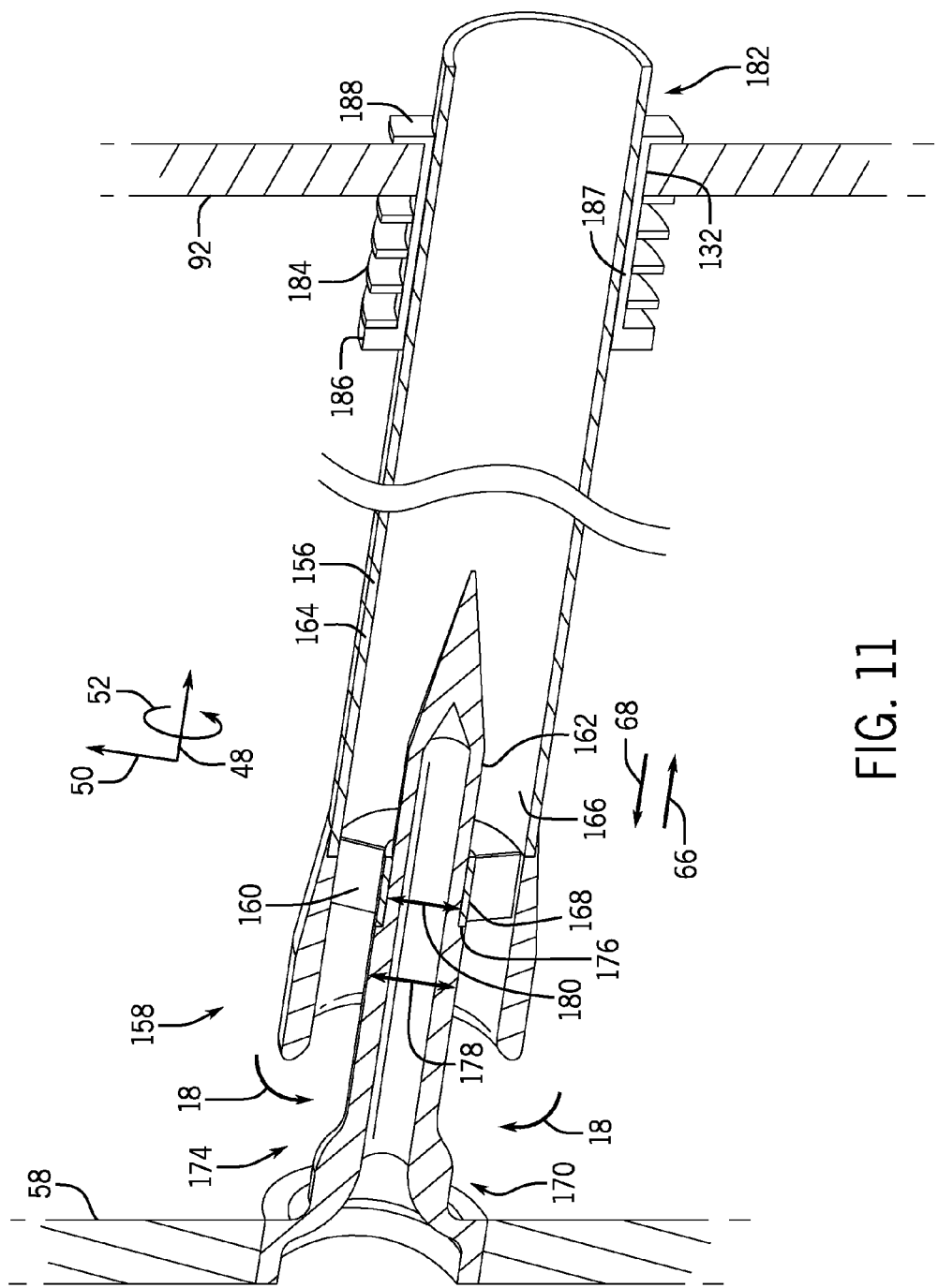

SYSTEM HAVING MULTI-TUBE FUEL NOZZLE WITH FLOATING ARRANGEMENT OF MIXING TUBES

BACKGROUND

The subject matter disclosed herein relates generally to gas turbine engines and, more particularly, fuel injectors in gas turbine combustors.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes a fuel nozzle assembly, e.g., with multiple fuel nozzles, to inject fuel and air into a combustor. The design and construction of the fuel nozzle assembly can significantly affect the mixing and combustion of fuel and air, which in turn can impact exhaust emissions (e.g., nitrogen oxides, carbon monoxide, etc.) and power output of the gas turbine engine. Furthermore, the design and construction of the fuel nozzle assembly can significantly affect the time, cost, and complexity of installation, removal, maintenance, and general servicing. Therefore, it would be desirable to improve the design and construction of the fuel nozzle assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an end cover assembly and a multi-tube fuel nozzle. The multi-tube fuel nozzle includes a first plate, and multiple tubes. The multiple tubes are supported in a floating arrangement between the end cover assembly and the first plate. Each tube includes a forward end adjacent the end cover assembly and an aft end adjacent the plate.

In a second embodiment, a system includes an end cover assembly and a multi-tube fuel nozzle. The multi-tube fuel nozzle includes a plate, a premixer tube, an aft end, and an axial spring. The premixer tube is disposed about a fuel injector between the end cover assembly and the plate. The premixer tube includes a forward end adjacent the end cover assembly and disposed about the fuel injector and an aft end adjacent the plate. The axial spring is disposed between the fuel injector and the forward end of the premixer tube.

In a third embodiment, a system includes an end cover assembly and a multi-tube fuel nozzle. The multi-tube fuel nozzle includes a first plate, a second plate, multiple premixer tubes, and an axial spring. Each premixer tube is disposed between the end cover assembly and the first plate. Each premixer tube extends through the second plate. Each premixer tube includes a forward end adjacent the end cover assembly and an aft end adjacent the first plate. The axial spring is disposed about the aft end of each tube between the first and second plates.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 11 is a cross-sectional view of an embodiment of a floating tube configuration in which the forward end of the mixing tube is supported by a support structure within an inner wall of the mixing tube and is additionally supported by an axial spring on the aft end of the mixing tube.

DETAILED DESCRIPTION

Figure 1:
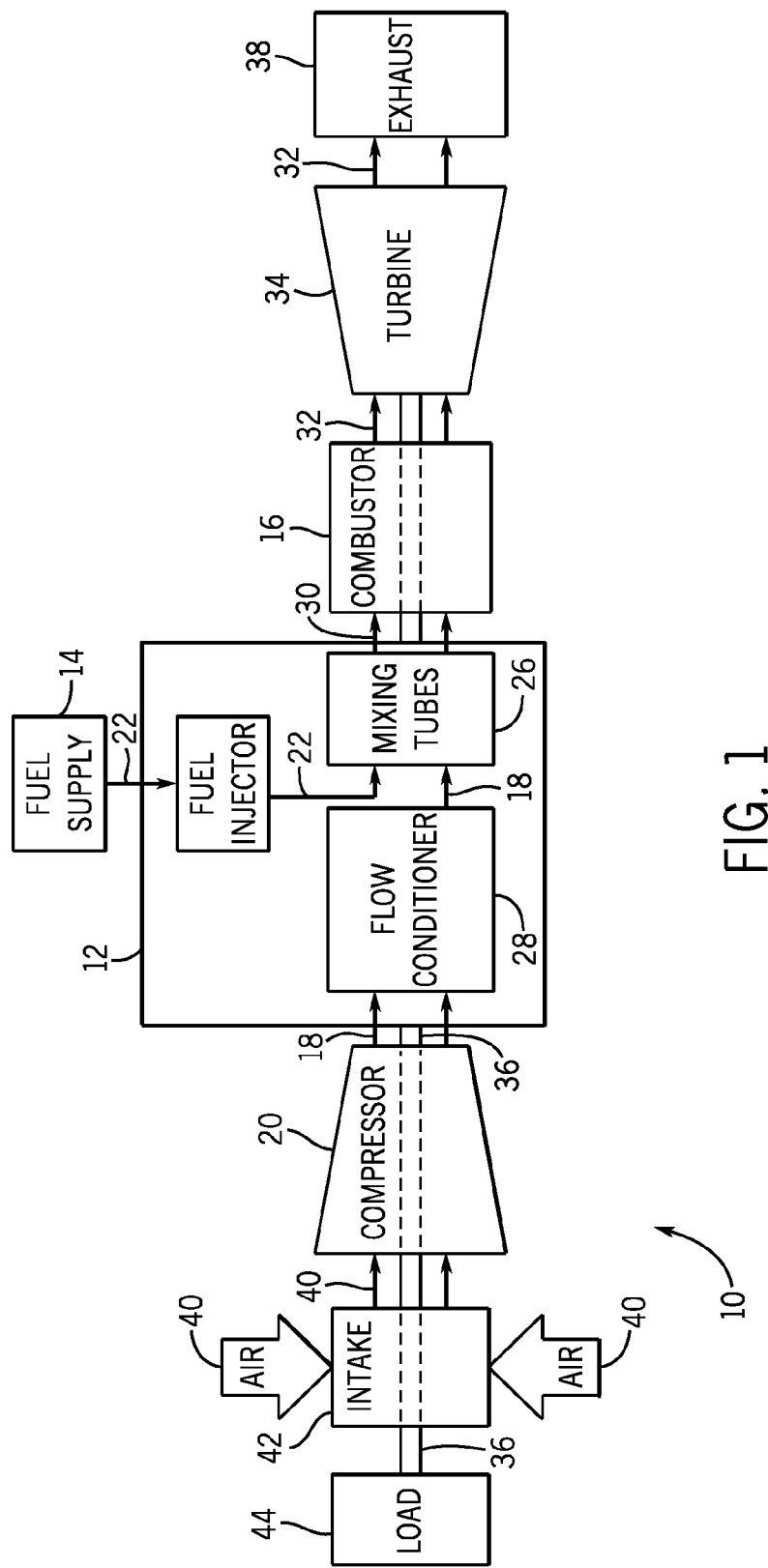
FIG. 1 is a block diagram of an embodiment of a gas turbine system having a multi-tube fuel nozzle within a combustor, wherein the tubes are in a floating configuration.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems for micromixing of air and fuel within fuel nozzles (e.g., multi-tube fuel nozzles) of gas turbine engines. As discussed in detail below, the multi-tube fuel nozzle includes a plurality of mixing tubes (e.g., 10 to 1000) spaced apart from one another in a generally parallel arrangement or tube bundle, wherein each mixing tube has a fuel inlet, an air inlet, and a fuel-air outlet. The mixing tubes also may be described as air-fuel mixing tubes, premixing tubes, or micromixing tubes, because each tube mixes fuel and air along its length on a relatively small scale. For example, each mixing tube may have a diameter of approximately 0.5 to 2, 0.75 to 1.75, or 1 to 1.5 centimeters. The fuel inlet may be disposed at an upstream axial opening, the fuel-air outlet may be disposed at a downstream axial opening, and the air inlet (e.g., 1 to 100 air inlets) may be disposed along a side wall of the mixing tube. Furthermore, each mixing tube may include a fuel injector coupled to and/or extending axially into the fuel inlet at the upstream axial opening of the mixing tube. The fuel injector, which may be described as a tube-level fuel injector of the multi-tube fuel nozzle, may be configured to direct fuel into the mixing tube in a variety of directions, such as one or more axial directions, radial directions, circumferential directions, or any combination thereof.

The mixing tubes of each multi-tube fuel nozzle may be subjected to significant thermal gradients due to the heat of combustion, vibration due to combustion dynamics, and other motion due to flows through the fuel nozzle. As a result, each mixing tube may undergo thermal expansion and/or contraction. Accordingly, the disclosed embodiments mount the mixing tubes with a floating arrangement in the fuel nozzle (e.g., multi-tube fuel nozzle) of a gas turbine engine, wherein the floating arrangement may include one or more floating features such as springs (e.g., axial springs, radial springs, or a combination thereof) associated with each mixing tube, fuel nozzle, or a combination thereof. Due to the inherent properties of materials used in fuel nozzles, fluctuations in temperature that occur during operation cause expansion and contraction of components. In particular, signification expansion of mixing (e.g., premixing) tubes may occur within the fuel nozzle during gas turbine operation. The expansion may occur in both axial and radial directions. The mixing tubes are positioned adjacent fuel injectors and various plates within the fuel nozzle. The thermal expansion can cause gaps in the interfaces between adjacent components as well as mechanical stresses on adjacent components. Resilient mounting configurations (e.g., floating configurations) that accommodate radial and axial expansion can mitigate or avoid these problems. Accordingly, the disclosed embodiments provide a multi-tube fuel nozzle and an end cover assembly (e.g., a combustor end cover assembly) with various springs to accommodate thermal expansion and/or contraction, vibration, motion, or any combination thereof, thereby reducing potential stresses and avoiding crack formation due to such stresses.

The multi-tube fuel nozzle includes a first plate, and multiple tubes disposed between the end cover assembly and first plate and supported in a floating arrangement. Each tube includes a forward end that is disposed adjacent to the end cover assembly and an aft end adjacent the plate. Each tube may be configured to take into account thermal expansion of the mixing tube in the radial and axial directions. Additional aspects of present systems include axial and/or radial springs disposed between the mixing tube and adjacent components, such as the fuel injector. The plate of the fuel nozzle may include multiple pockets for receiving the aft ends of the tubes, and for enabling the tube to extend axially within the combustor. To hold tubes in their respective pocket, some embodiments provide an axial spring that exerts force in the axial direction. A radial spring may be disposed between the fuel injector and forward end of its respective mixing tube to support the mixing tube in a radial direction and enable radial expansion of the tube. The radial spring may be disposed between an axial spring and the respective tube and may also be disposed about a fuel injector. The radial spring may have a first portion that extends in a radial direction about the forward end of a respective mixing tube and a second portion that extends in an axial direction along an inner surface of an annular wall of the tube. In some embodiments, the system may include at least one strut support (e.g., radial arm) that extends radially within the annular wall of the tube. The strut support may include a ring that extends around and supports a respective fuel injector while also acting as a guide for insertion of the respective fuel injector within the tube. The fuel nozzle may also include a second plate that the mixing tube extends through and an axial spring may be disposed about the aft end of the mixing tube and between the first and second plates.

Turning now to the drawings and referring first to FIG. 1, a block diagram of an embodiment of a gas turbine system 10 is illustrated. The gas turbine system 10 includes one or more fuel nozzles 12 (e.g., multi-tube fuel nozzles), a fuel supply 14, and a combustor 16. The fuel nozzle 12 receives compressed air 18 from an air compressor 20 and fuel 22 from the fuel supply 14. Although the present embodiments are discussed in context of air as an oxidant, the present embodiments may use air, oxygen, oxygen-enriched air, oxygen-reduced air, oxygen mixtures, or any combination thereof. As discussed in further detail below, the fuel nozzle 12 includes a plurality of fuel injectors 24 (e.g., 10 to 1000) and associated mixing tubes 26 (e.g., 10 to 1000), wherein each mixing tube 26 has an air flow conditioner 28 to direct and condition an air flow into the respective tube 26, and each mixing tube 26 has a respective fuel injector 24 (e.g., in a coaxial or concentric arrangement) to inject fuel into the respective tube 26. Each mixing tube 26 mixes the air and fuel along its length, and then outputs an air-fuel mixture 30 into the combustor 16. In certain embodiments, the mixing tubes 26 may be described as micromixing tubes or premixing tubes, which may have diameters between approximately 0.5 to 2, 0.75 to 1.75, or 1 to 1.5 centimeters. The mixing tubes 26 may be arranged in one or more bundles (e.g., 1, 2, 3, 4, 5, 6, 7, 8, 9, 10, or more) of closely spaced tubes, generally in a parallel arrangement relative to one another. In this configuration, each mixing tube 26 is configured to mix (e.g., micromix) on a relatively small scale within each mixing tube 26, which then outputs a fuel-air mixture 30 into the combustion chamber.

The floating configurations of the mixing tubes 26 in the disclosed embodiments enable thermal expansion of the tubes 26 while maintaining the integrity of surrounding components. Features such as springs and various mounting arrangements enable the floating configurations. For example, one embodiment, to be described below, includes an axial spring disposed on the upstream side of the tube 26, creating a preload wherein the downstream end of the tube 26 is disposed within one or more plates on the downstream side of the fuel nozzle 12. Another embodiment, to be described below, includes an axial spring disposed on the downstream end of the tube 26 between plates on the downstream end of the fuel nozzle 12. Another embodiment includes a tube with an open region between upstream components of the fuel nozzle 12 and a support within the tube coupling it to the fuel injector 24, wherein a spring disposed on the downstream end of the tube but upstream of the plates supports the tube axially while allowing for axial expansion. All of the disclosed embodiments may additionally include radial springs to enable thermal expansion of the tubes 26 radially. Additionally, the floating arrangements, discussed in greater detail below, enable easy removal of the tubes 26 for simplified replacement or repair.

The combustor 16 ignites the fuel-air mixture 30, thereby generating pressurized exhaust gases 32 that flow into a turbine 34. The pressurized exhaust gases 32 flow against and between blades in the turbine 34, thereby driving the turbine 34 to rotate a shaft 36. Eventually, the exhaust 32 exits the turbine system 10 via an exhaust outlet 38. Blades within the compressor 20 are additionally coupled to the shaft 36, and rotate as the shaft 36 is driven to rotate by the turbine 34. The rotation of the blades within the compressor 20 compresses air 40 that has been drawn into the compressor 20 by an air intake 42. The resulting compressed air 18 is then fed into one or more multi-tube fuel nozzles 12 in each of the combustors 16, as discussed above, where it is mixed with fuel 22 within the mixing tubes 26 (e.g. micromixing tubes, or premixer tubes supported in a floating arrangement) and ignited, creating a substantially self-sustaining process. Further, the shaft 36 may be coupled to load 44. As will be appreciated, the load 44 may be any suitable device that may generate power via the torque of a turbine system 10, such as a power generation plant or an external mechanical load. Combustion of the fuel-air mixture 30 may cause considerable thermal gradients throughout the gas turbine system 10. In particular, the elements within the fuel nozzle 12 adjacent the combustion chamber 46 may experience large thermal gradients. Due to the nature of the materials used, when exposed to thermal gradients these components can experience large amounts of thermal expansion. The implementation of floating configurations that mitigate the effects of any thermal expansion of the multiple mixing tubes 26 will be discussed in greater detail below.

Figure 2:
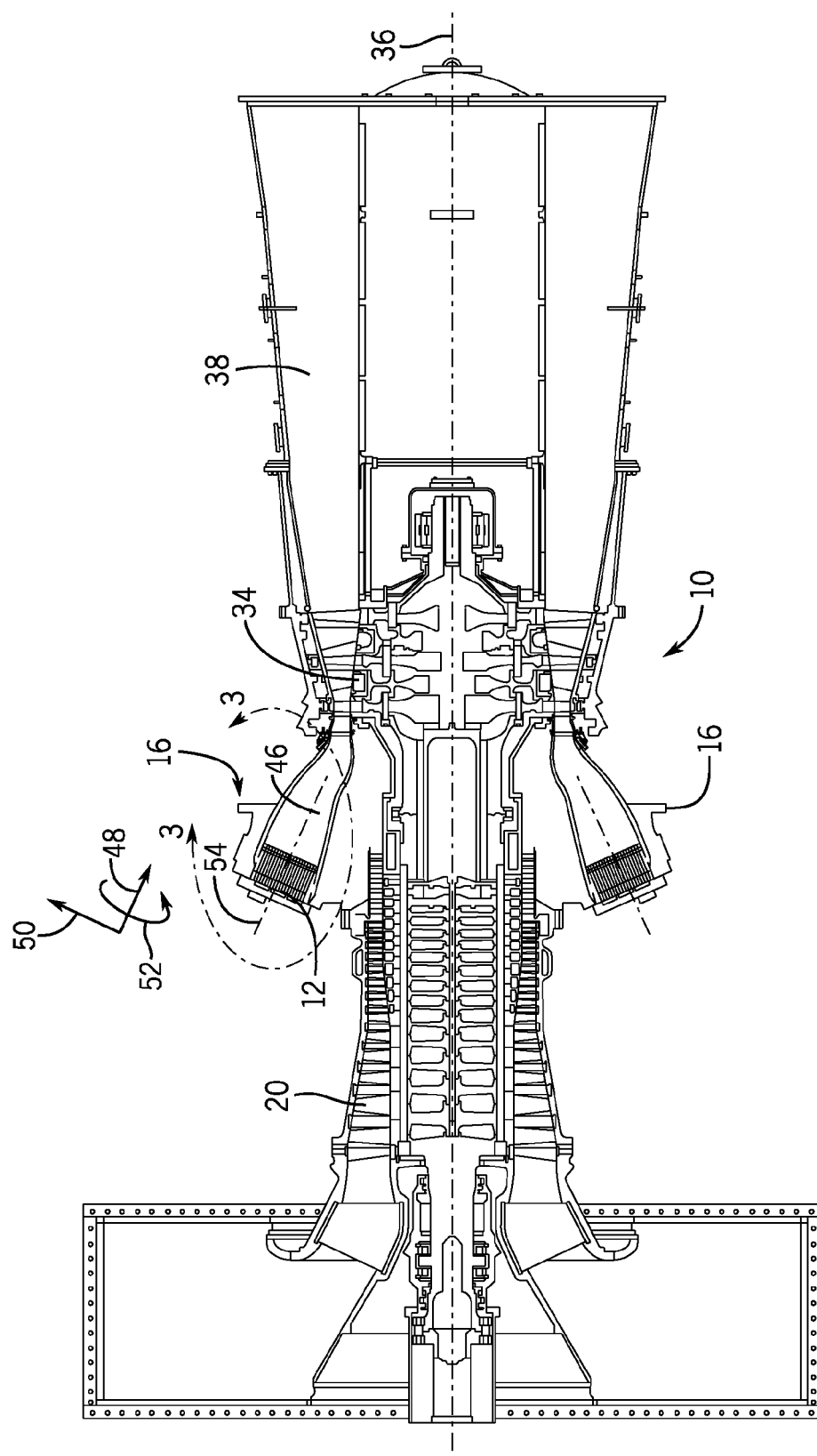
FIG. 2 is a cutaway side view of an embodiment of the gas turbine system of FIG. 1 illustrating the physical relationship among components of the system.

FIG. 2 shows a cutaway side view of the embodiment of gas turbine system 10 of FIG. 1. As depicted, the embodiment includes a compressor 20, which is coupled to an annular array of combustors 16. Each combustor 16 includes at least one fuel nozzle 12 (e.g., a multi-tube fuel nozzle) which feeds the fuel-air mixture 30 to a combustion chamber 46 located within each combustor 16. Combustion of the fuel-air mixture 30 within combustors 16, as mentioned above in regard to FIG. 1, causes vanes or blades within the turbine 34 to rotate as exhaust gases 32 (e.g., combustion gases) pass toward an exhaust outlet 38. The fuel nozzle 12 experiences changes in temperature during operation of the gas turbine. These temperature changes produce changes in the dimensions of the fuel nozzle 12. The amount of the dimensional changes in the components of the fuel nozzle 12, namely the mixing tubes 26, can be problematic with respect to their placement and attachment within the fuel nozzle 12. In particular, if the tubes 26 are rigidly fixed to the inside of the fuel nozzle 12, excessive stresses can develop within the fuel nozzle 12. As will be discussed in detail below, certain embodiments of the configuration of the mixing tubes 26 of the fuel nozzle 12 include resilient features to enable thermal expansion of the mixing tubes 26 and prevent excessive stresses from developing. Throughout the discussion, a set of axes will be referenced. These axes are based on a cylindrical coordinate system and point in an axial direction 48, a radial direction 50, and a circumferential direction 52. For example, the axial direction 48 extends along a length or longitudinal axis 54 of the fuel nozzle 12, the radial direction 50 extends away from the longitudinal axis 54, and the circumferential direction 52 extends around the longitudinal axis 54.

Figure 3:
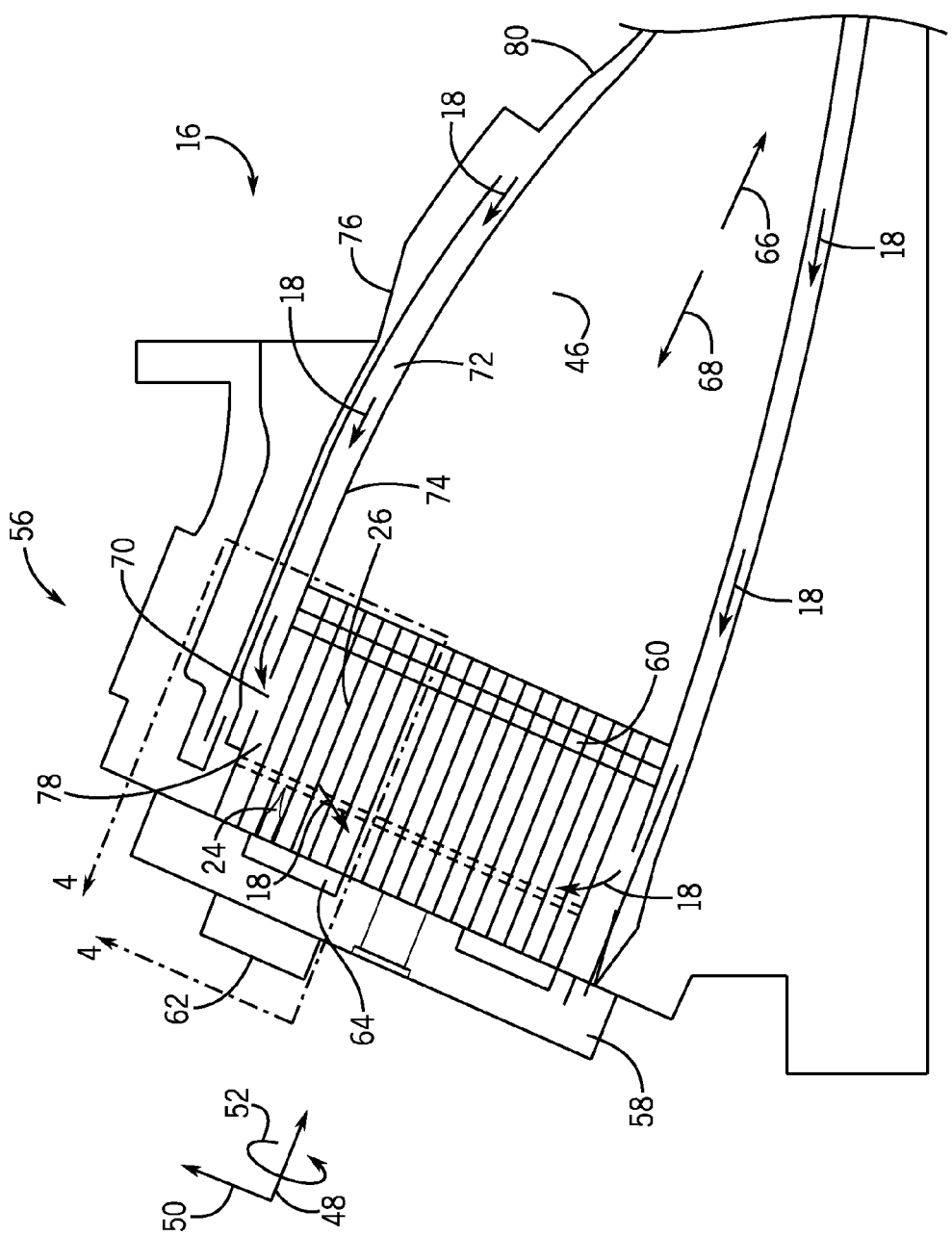
FIG. 3 is a cutaway side view of an embodiment of a portion of the combustor of FIG. 2, taken within line 3-3, illustrating the multi-tube fuel nozzle coupled to an end cover assembly of the combustor.

FIG. 3 is a cutaway side view of the combustor 16 of the gas turbine system 10 of FIG. 2 and taken within line 3-3 of FIG. 2. As shown, the combustor 16 includes a head end 56 and a combustion chamber 46. The fuel nozzle 12 is positioned within the head end 56 of the combustor 16. Within the fuel nozzle 12 are suspended the multiple mixing tubes 26 (e.g., air-fuel pre-mixing tubes). The mixing tubes 26 generally extend axially 48 between an end cover assembly 58 of the combustor 16 and a cap face assembly 60 of the fuel nozzle 12. The mixing tubes 26 may be configured to mount within the fuel nozzle 12 between the end cover assembly 58 and cap face assembly 60 in a floating arrangement or configuration, as further described below. The end cover assembly 58 may include a fuel inlet 62 and fuel plenum 64 for providing fuel 22 to multiple fuel injectors 24. As discussed above, in the disclosed embodiments, each individual fuel injector 24 is partially disposed within an individual mixing tube 26. During the combustion process, fuel 22 moves axially 48 through each of the mixing tubes 26 from the end cover assembly 58 (via the fuel injectors 24) through the cap face assembly 60 and to the combustion chamber 46. The direction of this movement along the longitudinal axis 54 of the fuel nozzle 12 will be referred to as the downstream direction 66. The opposite direction will be referred to as the upstream direction 68.

As described above, the compressor 20 compresses air 40 received from the air intake 42. The resulting flow of pressurized compressed air 18 is provided to the fuel nozzles 12 located in the head end 56 of the combustor 16. The pressurized air 18 enters the fuel nozzles 12 through air inlets 70 to be used in the combustion process. More specifically, the pressurized air 18 flows from the compressor 20 in an upstream direction 68 through an annulus 72 formed between a liner 74 (e.g., an annular liner) and a flow sleeve 76 (e.g., and annular flow sleeve) of the combustor 16. At the end of this annulus 72, the compressed air 18 is forced into the air inlets 70 of the fuel nozzle 12 and fills an air plenum 78 within the fuel nozzle 12. The pressurized air 18 in the air plenum 78 then enters the multiple mixing tubes 26 through the air flow conditioner 28. Inside the mixing tubes 26, disposed on an upstream or forward end of each tube 26, the air 18 is then mixed with the fuel 22 provided by the fuel injectors 24. The fuel-air mixture 30 flows in a downstream direction 66 from the mixing tubes 26 into the combustion chamber 46, where it is ignited and combusted to form the combustion gases 32 (e.g., exhaust gases). The heat from this combustion contributes to the thermal expansion of the mixing tubes 26. As discussed above, thermal expansion may cause stresses on the components of the combustor 16 that can shorten the life span of the combustor 16 and result in less efficient operation. The disclosed embodiments of floating tube arrangements to be disclosed mitigate the effects of thermal expansion of the tubes 26. The combustion gases 32 flow from the combustion chamber 46 in the downstream direction 66 to a transition piece 80. The combustion gases 22 then pass from the transition piece 80 to the turbine 34, where the combustion gases 22 drive the rotation of the blades within the turbine 34.

Figure 4:
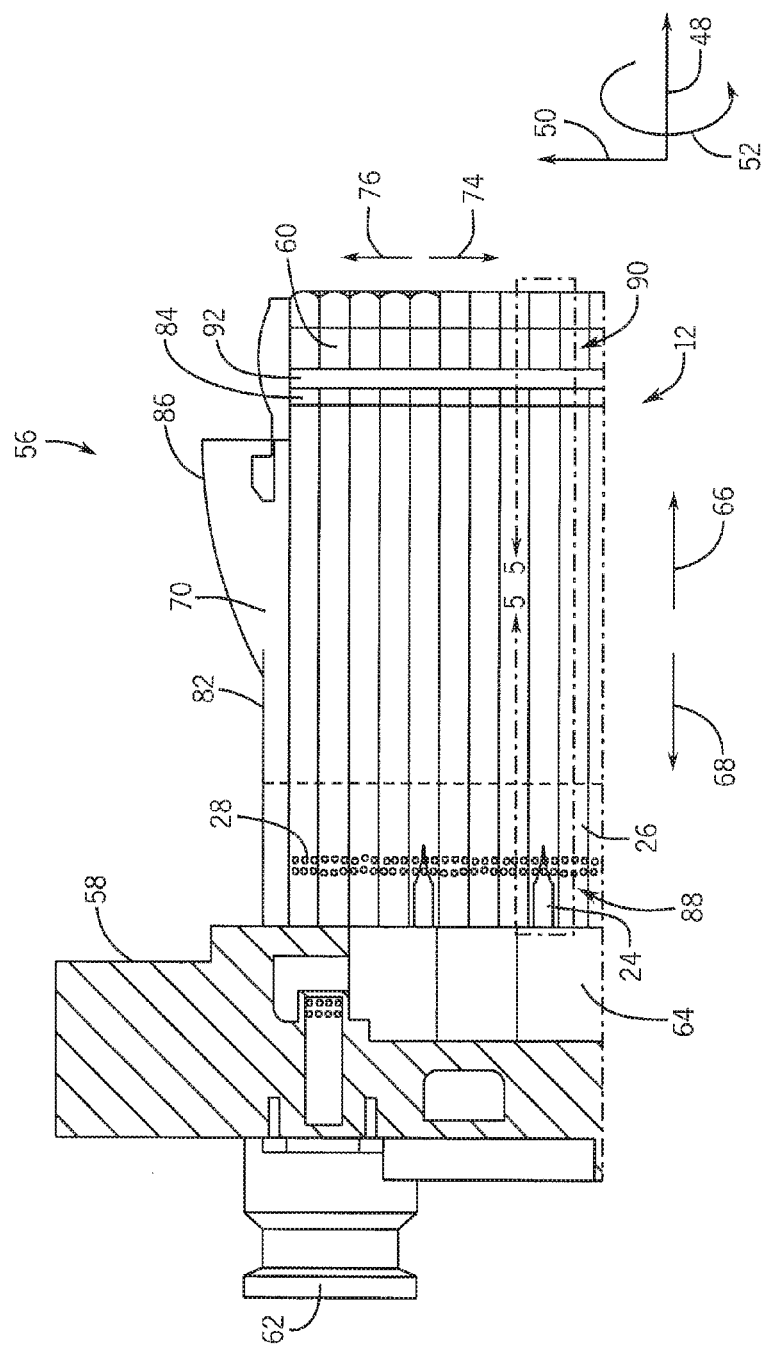
FIG. 4 is a partial cross-sectional view of the combustor of FIG. 3, taken within line 4-4 of FIG. 3, showing details of the multi-tube fuel nozzle and the end cover assembly.

FIG. 4 is a partial cross-sectional side view of the combustor 16 as taken within line 4-4 of FIG. 3. The head end 56 of the combustor 16 contains a portion of the multi-tube fuel nozzle 12. A support structure 82 surrounds the multi-tube fuel nozzle 12 and the multiple mixing tubes 26 disposed within the nozzle 12. As discussed above, in some embodiments, each mixing tube 26 may extend axially between the end cover assembly 58 and the cap face assembly 60. Features of the support provided by the end cover assembly 58 and cap face assembly 60 allow for the disclosed floating arrangements (e.g., resilient support arrangements) of the mixing tubes 26. The mixing tubes 26 may further extend through the cap face assembly 60 to feed the fuel-air mixture 30 directly to the combustion chamber 46. Some embodiments to be disclosed will include features of the tubes 26 substantially disposed in the cap face assembly 60. Each mixing tube 26 is positioned to surround a fuel injector 24 (e.g., in a coaxial or concentric arrangement), such that the injector 24 receives fuel 22 from the fuel plenum 64 and directs the fuel into an upstream (e.g. forward end 88) of the tube 26. In some embodiments, the features of the fuel injector 26 will allow one end of the tube 26 to be supported while leaving a clearance that defines an air inlet region (e.g. of an air flow conditioner 28) between the tube 26 and end cover assembly 58. The fuel plenum 64 is fed fuel 22 entering the fuel inlet 62 located on the end cover assembly 58. In some embodiments, a retainer plate 84 and/or an impingement plate 92 may be positioned within the fuel nozzle 12 surrounding a downstream end (e.g. aft end 90) of the mixing tubes 26 generally proximate to the cap face assembly 60. The impingement plate 92 may include a plurality of impingement cooling orifices, which may direct jets of air to impinge against a rear surface of the cap face assembly 60 to provide impingement cooling.

Figure 5:
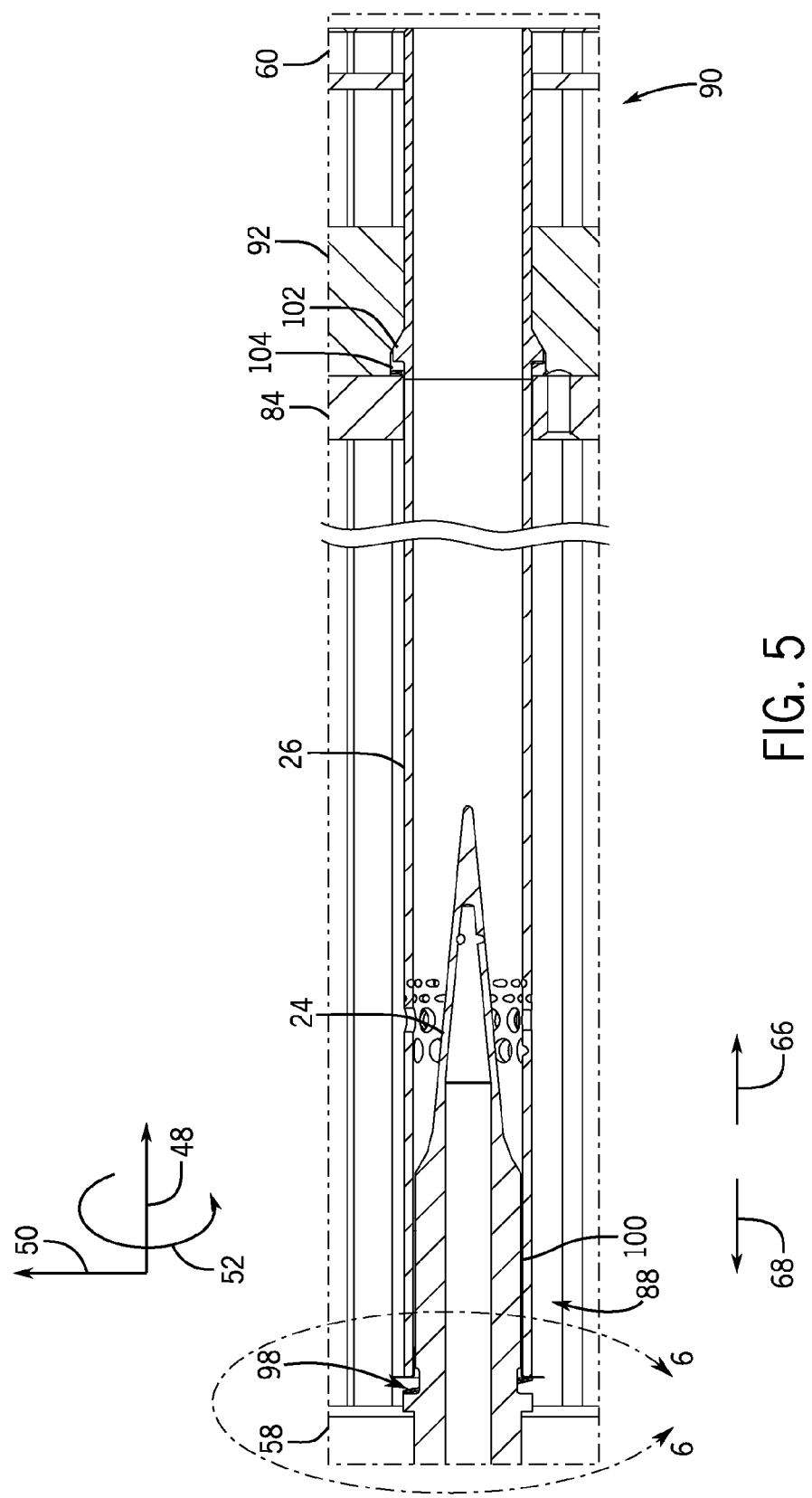
FIG. 5 is a cross-sectional side view of an embodiment of the forward and aft ends of an individual tube and respective fuel injector of the multi-tube fuel nozzle of FIG. 4, taken within line 5-5, in which a floating tube configuration includes the forward end of the mixing tube supported by an axial spring.

FIG. 5 is an illustration of an embodiment of the floating mixing tube 26 configuration in which the tube 26 is disposed between the fuel nozzle end cover assembly 58 and the cap face assembly 60 in a floating arrangement. The tube 26 has a forward (e.g., upstream) end 88 adjacent the end cover assembly 58 and an aft (e.g., downstream) end 90 adjacent the cap face assembly 60. The floating configuration is implemented in this embodiment by installation of both an axial spring 98 (e.g., heli-wave spring) and a radial spring 100 on the forward end 88 of the tube 26. As discussed above, the forward end 88 of the mixing tube 26 is disposed about the fuel injector 24. The radial spring 100 is disposed radially between the fuel injector 24 and forward end 88 of the mixing tube 26 and enables thermal expansion in the radial direction 50. The radial spring 100 also extends circumferentially about the fuel injector 24, e.g., an annular spring 100. The axial spring 98 is disposed circumferentially 52 around the upstream end 88 of the fuel injector 24, and is external from the mixing tube 26 in an axially abutting position against the mixing tube 26. In addition, the axial spring 98 is located adjacent and upstream of the radial spring 100. The axial spring 98 enables thermal expansion of the mixing tube 26 in the axial direction 48. The mixing tube 26 is closely fit on the aft end 90 where a raised annular ridge 102 on the mixing tube fits in an annular channel 104 on the impingement plate 92. The ridge 102 and channel abutment 104 opposes any axial force exerted in the axial direction 48 by the tube 26, while the axial spring 98 disposed between the forward end 88 of the tube 26 and the end cover assembly 58 creates an axial tension in the mixing tube 26. Details of how the springs 98 and 100 relieve mechanical stresses caused by thermal expansion will be discussed further below.

Figure 6:
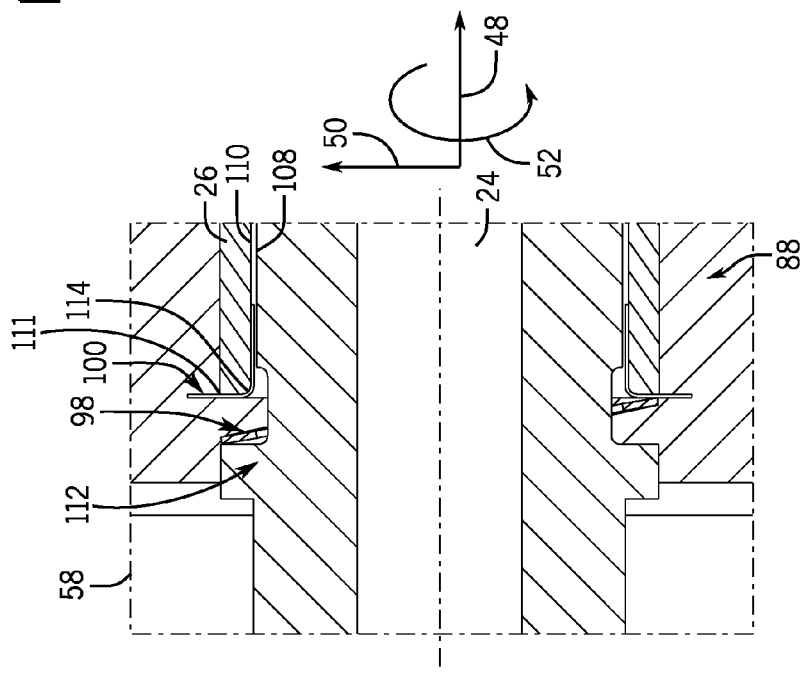
FIG. 6 is a detailed view of the forward end of the tube in the floating tube configuration of FIG. 5, taken within line 6-6.

FIG. 6 is a detailed view of the mixing tube 26 proximate to the end cover assembly 58 of FIG. 5, showing the relationship between the axial spring 98, mixing tube 26, fuel injector 24, end cover assembly 58, and radial spring 100. The radial spring 100 is disposed between the mixing tube 26 and the fuel injector 24 and is in contact with an inner surface 108 of the mixing tube 26 and also in contact with the fuel injector 24 along its outer surface 110. The radial spring 100 additionally includes a stop portion 111 (e.g., an annular lip or flange) that extends radially and is disposed directly upstream 68 of the mixing tube 26 and blocks the radial spring 100 from movement in a downstream direction 66. The radial spring 100 supports the tube 26 radially relative to the fuel injector 24, and applies outward radial 50 pressure against the inner surface 108 of the mixing tube 26 and inward radial 50 pressure against the outer surface 110 of the fuel injector 26. Thus, the radial spring 100 provides resiliency to allow thermal expansion of both the mixing tube 26 and the fuel injector 24 in the radial direction 50 while still maintaining a close fit (and seal) between the components and reducing any stresses that may occur if expansion of adjacent components (e.g., the end cover assembly 58, impingement plate 92, retainer plate 84, cap face assembly 60) is not matched. For example, if the fuel injector 24 experiences radial expansion at a rate greater than the radial expansion of the mixing tube 26, the mixing tube 26 can experience stress and possibly deformation without the spring 100. To counter axial expansion and deformation of the components axially adjacent to the mixing tube 26, the axial spring 98 is installed between the mixing tube 26 and fuel injector 24. The axial spring 98 is located between an annular stop 112 (e.g., protrusion or abutment) on the fuel injector 24 and the upstream edge 114 of the mixing tube 26. The axial spring 98 exerts axial pressure on both surfaces 112 and 114. Specifically, the axial spring 98 exerts pressure in an upstream direction 68 along the axial axis 48 of the fuel injector 24 against the annular stop 112, and pressure in a downstream direction 66 along the axial axis 48 of the mixing tube 26 through its upstream edge 114. In operation, the spring 98 axially expands and contracts to accommodate any movement (e.g., thermal expansion or contraction) between the tube 26 and the fuel injector.

Figure 7:
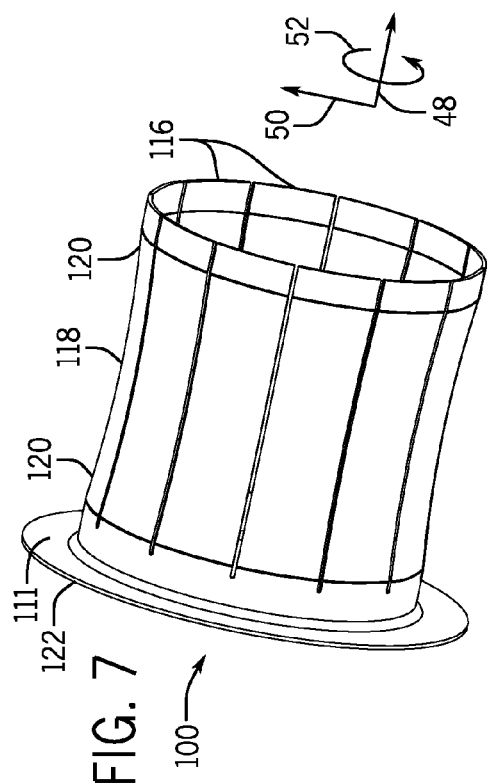
FIG. 7 is a perspective view of an embodiment of the radial spring of FIG. 5.

FIG. 7 is a perspective of an embodiment of the radial spring 100. The radial spring 100 is designed to fit within the inner surface 108 of the mixing tube 26 between the tube 26 and the fuel injector 24, and provides radial support (e.g., resiliency) between the tube 26 and injector 24 in the radial direction 50. The radial spring 100 has a plurality of arms 116 disposed in a circumferentially 52 spaced arrangement, wherein each arm 116 generally extends in the axial direction 48 away from the stop portion 111 (e.g., annular lip or flange 122). In the illustrated embodiment, the arms 116 are generally angled, bent, curved, or non-parallel to the axial direction 48, such that a radial bias or spring force may be provided between the inner surface 108 of the mixing tube 26 and the outer surface 110 of the fuel injector 24. For example, each arm 116 has a middle portion 118 disposed between end portions 120, wherein the end portions 120 are angled radially inward toward the middle portion 118. In other words, the portions 118 and 120 may define a C-shape, U-shape, or generally curved shape, such as a leaf spring. Thus, the arms 116 may be described as a plurality of leaf springs. Collectively, the arms 116 create a radial force against both the inner surface 108 of the mixing tube 26 and the outer surface 110 of the fuel injector 24, thereby creating a resilient support that can expand and contract in the radial direction 50 while also providing sealing between the tube 26 and fuel injector 24. In other embodiments, the spring 100 may include a generally annular spring that is wavy or variable in diameter in the circumferential direction 52. Again, the radial spring 100 has the stop portion 111 to help retain the spring 100 axially between the fuel injector 24 and the mixing tube 26. As discussed above, this stop portion 111 (e.g., flange 122), when disposed between the upstream edge 114 of the mixing tube 26 and the annular stop 112 of the fuel injector 24, blocks axial movement of the radial spring 100 to hold the spring 100 at a desired axial position within the mixing tube 26.

Figure 8:
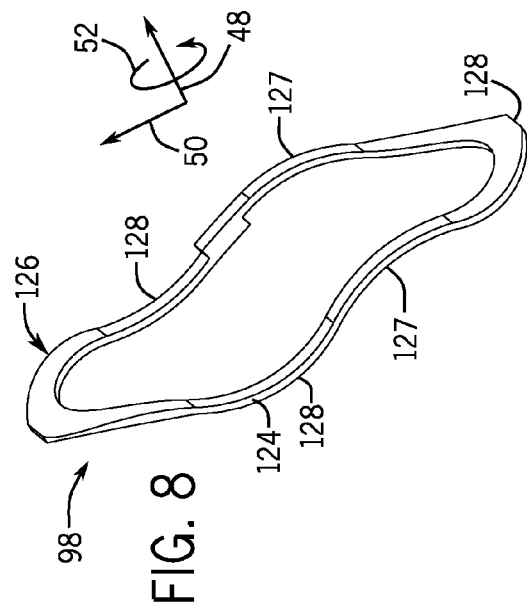
FIG. 8 is a perspective view of an embodiment of the axial spring of FIG. 5.

FIG. 8 is an embodiment of the axial spring 98. The axial spring 98 may have an annular or ring-shaped body 124 with a plurality of waves 126 (e.g., curving back and forth), which include alternating raised portions 127 (e.g., upward curves or convex portions) and recessed portions 128 (e.g., inward curves or concave portions). In other words, the waves 126 may be described as alternating back and forth in opposite axial directions to define the raised portions 127 and recessed portions 128. For example, the raised portions 127 may extend in the downstream direction 66 while the recessed portions 128 may extend in the upstream direction 68, or vice versa. In operation, the raised and recessed portions 127 and 128 of the waves 126 may move axially toward and away from one another in response to axial movement between the fuel injector 24 and the mixing tube 26, thereby helping to provide resilient support between the fuel injector 24 and the mixing tube 26. When installed, the spring 98 creates an axial force against the upstream edge 114 of the mixing tube 26 and the annular stop 112 of the fuel injector 24, which axial force may help to provide an axial tension in the mixing tube 26. In certain embodiments, the axial spring 98 is compressed between the mixing tube 26 and end cover assembly 58. In some embodiments, one or more axial spring 98 may be mounted in various locations along the mixing tube 26, e.g., between the mixing tube 26 and the fuel injector 24, the impingement plate 92, and/or retainer plate 84. Further, the axial spring 98 may include a variety of spring designs, such as a spiral, helical, or coil spring, a conical spring, or any combination thereof.

Figure 9:
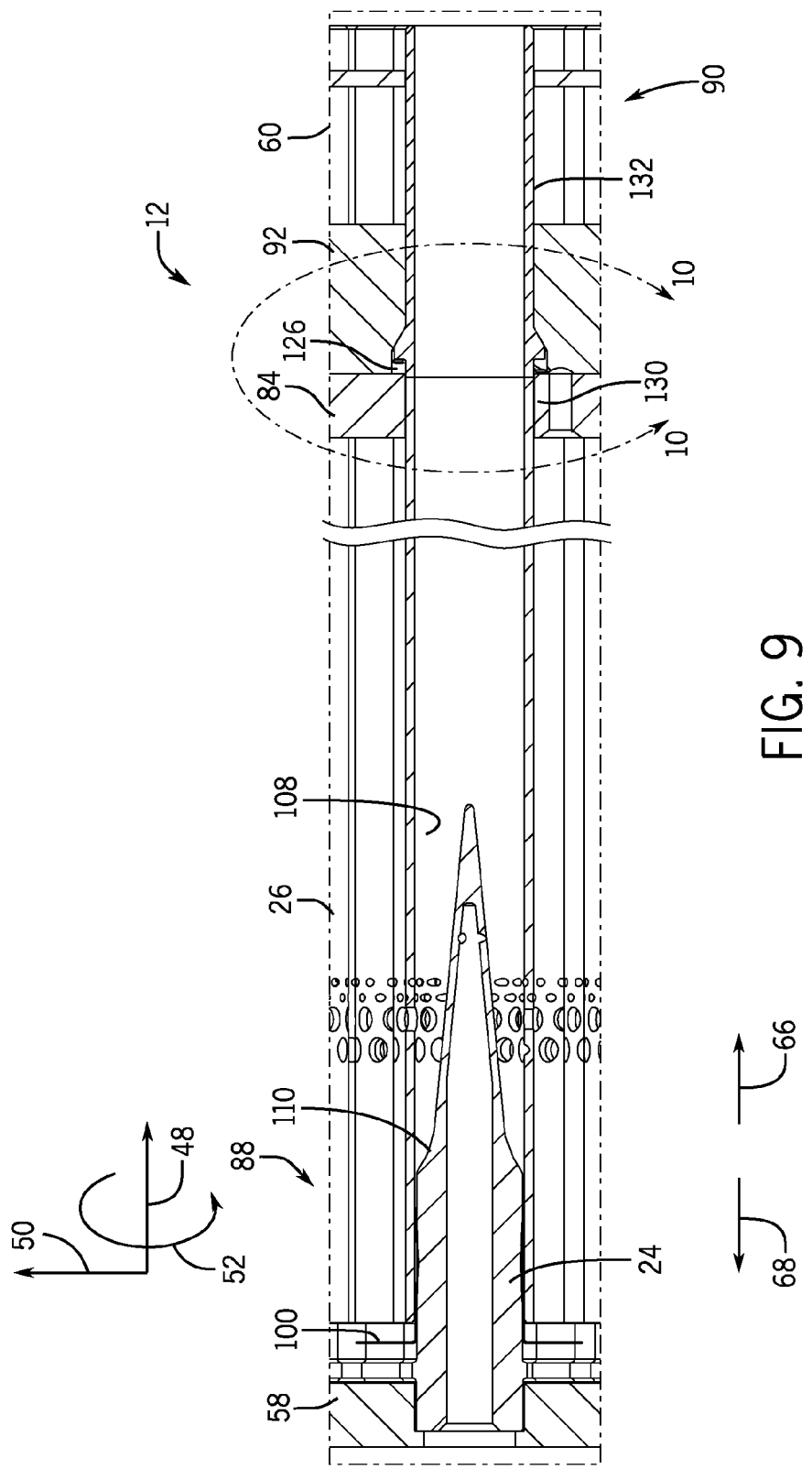
FIG. 9 is cross-sectional view of an embodiment of a floating tube configuration in which an aft end of the mixing tube is in supported by an axial spring.

FIG. 9 is an embodiment of a floating tube configuration in which the aft end 90 of the mixing tube 26 is supported with an axial spring 126 (e.g., spring 98). As illustrated, the forward end 88 of the mixing tube 26 is disposed circumferentially 52 about a fuel injector 24. The retainer plate 84 and impingement plate 92 contain openings 130 and 132 (e.g., pockets) that enable the mixing tube 26 to pass through the plates 84, 92 in the axial direction 48. The axial spring 126 is installed about the aft end 90 and between the two plates 84, 92. The axial spring 126 bears a load in response to being deflected in the axial direction 48 and provides a preload between two surfaces (e.g., the retainer plate 84 and impingement plate 92). This floating configuration holds the mixing tube 26 in a substantially stable axial position, while still enabling thermal expansion of the tube 26 during operation of the fuel nozzle 12. Details of how this floating configuration supports the tube 26 in the axial direction 48 are discussed below. As depicted, the radial spring 100 is installed on the forward end 88 of the tube 26 between the inner surface 108 of the tube 26 and the outer surface 110 of the fuel injector 24. The radial spring 100, as in previously described embodiments, resiliently supports the mixing tube 26 and enables thermal expansion in the radial direction 50. Additionally, in some embodiments, an axial spring 98 may be disposed on the forward end 88 of the tube 26 to provide additional axial 48 support to the tube 26 (see FIG. 6).

Figure 10:
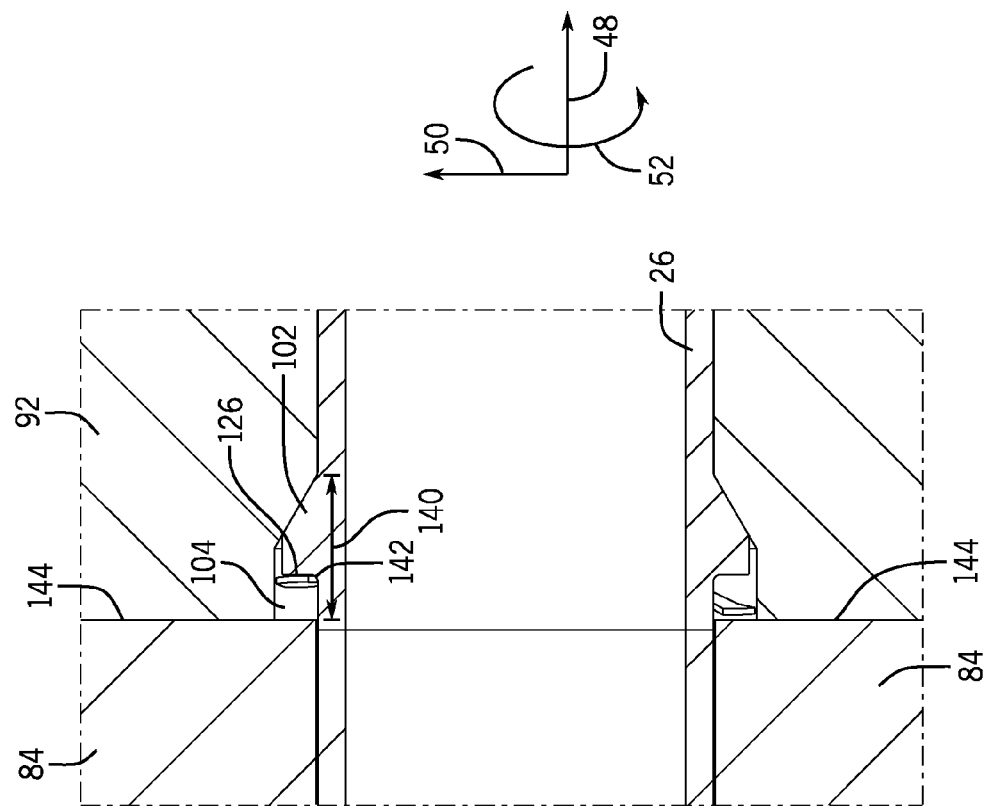
FIG. 10 is a cross-sectional view of the aft end of the floating tube configuration of FIG. 9, taken within line 10-10.

FIG. 10 is a cross-sectional view of the aft end 90 of the floating mixing tube configuration of FIG. 9, taken within line 10-10. As illustrated, the impingement plate 92 has the annular channel 104 and the mixing tube 26 has the annular ridge 102 that fits inside the annular channel 104. The ridge 102 has a smaller axial length 140 than the channel 104, providing axial space for the axial spring 126 (e.g., spring 98). When installed, the axial spring 126 is compressed between an upstream surface 142 of the annular ridge 102 on the mixing tube 26 and a downstream face 144 of the retainer plate 84, such that the spring 126 and exerts axial force on both surfaces 142, 144. As discussed above, the axial spring 126 bears a load from this deflection and provides a preload between the two surfaces 142, 144. This arrangement enables thermal expansion of the tube 26 in the axial direction 48 while maintaining a resilient axial support for the mixing tube 26.

FIG. 11 is an embodiment of a floating tube configuration of a mixing tube 26, 156 and fuel injector 24, 162. In the illustrated embodiment, a forward end 158 of the mixing tube 156 is supported by a plurality of support vanes or struts 160 (e.g., airfoil shaped radial arms), which provide radial support between the tube 156 and fuel injector 162. For example, 1, 2, 3, 4, 5, 6, 7, 8, 9, 10, or more struts 160 may extend between the tube 156 and fuel injector 162. The struts 160 may be rigid or resilient. For example, each strut 160 may include a spring element to provide some resiliency in the radial direction 50, or each strut 160 may be substantially rigid to block any radial movement between the tube 156 and injector 162. As depicted, the mixing tube 156 includes an annular wall 164 with an inner surface 166 having the struts 160. The struts 160 extend radially 50 inward from the inner surface 166 of the annular wall 164 and support the mixing tube 156 by connection to a support ring 168 that surrounds the fuel injector 162. The support ring 168 supports the mixing tube 156 both in the axial 48 and radial 50 directions around the fuel injector 162. The struts 160 are circumferentially 52 spaced apart from one another to define intermediate spaces or airflow paths, thereby enabling air to pass between the struts 160 and between the fuel injector 162 and the mixing tube 156.

The radial support provided by the struts 160 also enables an alternate embodiment of the air flow conditioner 28, 170, wherein the compressed air 18 enters the mixing tube 156 through an air inlet region 174 disposed between the forward end 158 of the mixing tube 156 and the end cover assembly 58. In the present embodiment, any axial load on the mixing tube 156 (e.g., axial load due to thermal axial expansion of the mixing tube 156) is transmitted from the tube 156 through the support vanes 160 and the support ring 168 and to the fuel injector 162 via a stop 176 (e.g., an annular recess and/or lip) on the fuel injector 162. In other embodiments, the strut support vanes 160 may be disposed adjacent the fuel injector 162 and directly transmit axial load to the fuel injector 162. As illustrated, the stop 176 is an upstream area on the fuel injector 162 with a diameter 178 that is greater than a diameter 180 on the fuel injector 162 having the support ring 168. The diameter 178 of the fuel injector stop 176 is also greater than the inner diameter of the support ring 168. This configuration blocks the mixing tube 156 from axially moving in the upstream 68 axial direction relative to the fuel injector 162. In other embodiments, the stop 176 may be an annular ridge on the fuel injector 162 directly upstream 68 from the support ring 168, or any other feature that will block upstream 68 axial movement of the mixing tube 156 relative to the fuel injector 162.

On an aft end 182 of the mixing tube 156, an axial spring 184 is disposed about the tube 156 and compressed between a stop 186 on the tube 156 and the impingement plate 92. The stop 186 is included on a cuff or sleeve 187 that is disposed circumferentially about the tube 156 and extends axially from a location upstream 68 of and proximate to the impingement plate 92, through the impingement plate pocket 132, to a location downstream 66 and adjacent to the impingement plate 92. In certain embodiments, the cuff 187 having the stop 186 is coupled to the mixing tube 26 (e.g., via a brazed joint, welded joint, threads, interference fit, etc.). In other embodiments, the cuff 187 having the stop 186 may be included as an integral portion of (e.g., one-piece with) the mixing tube 156 (e.g., as a machined ridge). The stop 186 allows any axial movement originating from the mixing tube 156, such as movement caused by thermal axial 48 expansion of the mixing tube 156 during operation of the fuel nozzle 12, to be transferred and absorbed by the axial spring 184. The illustrated embodiment also includes a lock tab 188 (e.g., annular tab or lip) on the cuff 187 disposed downstream 68 of the impingement plate 92, wherein the tab 188 blocks the mixing tube 156 from moving upstream 66 relative to the impingement plate 92. The tab 188 may be manufactured in a different arrangement (i.e., flush to the annular wall 164 of the mixing tube 156) to allow installation of the tube 156 through the impingement plate 92, and then deformed (i.e., bent radially outward) once the mixing tube 156 is installed. A radial spring could additionally be installed on the aft end 182 of the mixing tube 156 to allow a floating radial fit, and absorb radial movement that may occur due to thermal expansion during operation of the fuel nozzle 12.

Technical effects of the disclosed embodiments include systems for supporting mixing tubes 26 in a floating configuration to enable thermal expansion of mixing tubes 26 within multi-tube fuel nozzles 12. In particular, the mixing tubes 26 are held in place between radial springs 100 and axial springs 100, the end cover assembly 58 of the fuel nozzle 12 on a forward end 88, and either a single or multiple plates 84, 92 on the aft end 90. Axial 98 and radial 100 springs may be placed within and/or adjacent the tubes 26. Compression of the axial 98 and radial 100 springs between the tubes 26 and other components within the mixing tube 26 (e.g., the fuel nozzle 12, end cover assembly 58, retainer plate 84, and/or impingement plate 92) allow for thermal expansion of the mixing tubes 26 while maintaining functionality and integrity of the components of the fuel nozzle 12.

Although some typical sizes and dimensions have been provided above in the present disclosure, it should be understood that the various components of the described combustor may be scaled up or down, as well as individually adjusted for various types of combustors and various applications. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising: an end cover assembly; and a multi-tube fuel nozzle, comprising: a first plate; a plurality of premixer tubes supported in a floating arrangement between the end cover assembly and the first plate, wherein each premixer tube comprises a forward end adjacent the end cover assembly and an aft end adjacent the first plate, the forward end of each premixer tube is disposed about a fuel injector, each premixer tube extends through the first plate into a combustor chamber, and each premixer tube is configured to receive fuel and air and deposit a fuel-air mixture into the combustion chamber and a radial spring disposed about at least one premixer tube of the plurality of premixer tubes, wherein the radial spring is circumferentially disposed relative to a longitudinal axis of the multi-tube fuel nozzle about the fuel injector, and a portion of the radial spring contacts an inner surface of the at least one premixer tube and an outer surface of the fuel injector and is radially disposed relative to the longitudinal axis between the inner surface of the at least one premixer tube and the outer surface of the fuel injector.

2. The system of claim 1, wherein the radial spring enables movement of the at least one premixer tube in a radial direction relative to the longitudinal axis.

3. The system of claim 2, wherein the multi-tube fuel nozzle comprises an axial spring axially disposed relative to the longitudinal axis between the fuel injector and the forward end of the at least one premixer tube, wherein the axial spring is circumferentially disposed about the fuel injector downstream of an annular lip extending radially relative to the longitudinal axis from the fuel injector, and the axial spring is disposed upstream of the forward end of the at least one premixer tube.

4. The system of claim 1, wherein the radial spring comprises a plurality of arms extending from an annular lip.

5. The system of claim 1, wherein the multi-tube fuel nozzle comprises a second plate axially offset from the first plate, wherein each premixer tube of the plurality of premixer tubes extends through the second plate, and the multi-tube fuel nozzle comprises an axial spring disposed about the aft end of each premixer tube between the first and second plates.

6. The system of claim 5, wherein the first plate comprises a plurality of pockets for receiving the aft end of each premixer tube, and the axial spring exerts a force in an axial direction to hold the respective premixer tube in a respective pocket.

7. The system of claim 6, wherein the forward end of each premixer tube is disposed about a fuel injector, the multi-tube fuel nozzle comprises a radial spring disposed about the fuel injector, the radial spring is disposed between the fuel injector and the forward end of the respective premixer tube, and the radial spring is configured to support the respective premixer tube in a radial direction.

8. A system, comprising:
an end cover assembly; and
a multi-tube fuel nozzle, comprising:
a plate;
a premixer tube disposed about a fuel injector between the end cover assembly and the plate, wherein the premixer tube comprises a forward end adjacent the end cover and disposed about the fuel injector and an aft end adjacent the plate, and wherein the premixer tube extends through the plate into a combustion chamber, and the premixer tube is configured to receive fuel and air and deposit a fuel-air mixture into the combustion chamber; and
an axial spring axially disposed relative to a longitudinal axis of the multi-tube fuel nozzle between the fuel injector and the forward end of the premixer tube, wherein the axial spring is circumferentially disposed about the fuel injector downstream of an annular lip extending radially relative to the longitudinal axis from the fuel injector, and the axial spring is disposed upstream of the forward end of the premixer tube.

9. The system of claim 8, wherein the plate comprises a pocket for receiving the aft end of the premixer tube, and the axial spring exerts a force in an axial direction to hold the premixer tube in the pocket.

10. The system of claim 8, wherein the multi-tube fuel nozzle comprises a radial spring disposed between the fuel injector and the forward end of the premixer tube, the radial spring is disposed about the fuel injector, and the radial spring supports the radial tube in a radial direction.

11. A system, comprising: an end cover assembly; and a multi-tube fuel nozzle, comprising: a first plate; a second plate; a plurality of premixer tubes, wherein each premixer tube is disposed between the end cover assembly and the first plate, wherein each premixer tube extends through both the first and second plates into a combustion chamber, and each premixer tube comprises a forward end adjacent the end cover assembly and an aft end adjacent the first plate, and each premixer tube is configured to receive fuel and air and deposit a fuel-air mixture into the combustion chamber; and an axial spring circumferentially disposed relative to a longitudinal axis of the multi-tube fuel nozzle about the aft end of each premixer tube between the first and second plates, wherein the axial spring contacts the first plate and second plate.

12. The system of claim 11, wherein the first plate comprises a plurality of pockets for receiving the aft ends of the plurality of premixer tubes, and each axial spring exerts a force in an axial direction to hold a respective premixer tube in a respective pocket.

13. The system of claim 12, wherein the forward end of each tube is disposed about a fuel injector, the multi-tube fuel nozzle comprises a radial spring disposed about each fuel injector, the radial spring is disposed between the fuel injector and the forward end of the premixer tube, and the radial spring is configured to support the premixer tube in a radial direction.

* * * * *